(12) United States Patent
Shahana et al.

(10) Patent No.: US 11,319,022 B2
(45) Date of Patent: May 3, 2022

(54) TRANSMISSION CONTROL SYSTEM FOR USE WITH HUMAN-POWERED VEHICLE

(71) Applicant: Shimano Inc., Osaka (JP)

(72) Inventors: Satoshi Shahana, Osaka (JP); Nobukatsu Hara, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 450 days.

(21) Appl. No.: 16/546,772

(22) Filed: Aug. 21, 2019

(65) Prior Publication Data

US 2020/0062345 A1 Feb. 27, 2020

(30) Foreign Application Priority Data

Aug. 23, 2018 (JP) .............................. JP2018-156565

(51) Int. Cl.
*B62M 9/132* (2010.01)
*B62M 6/50* (2010.01)
*B62M 9/122* (2010.01)
*B62M 6/90* (2010.01)

(52) U.S. Cl.
CPC .............. *B62M 9/132* (2013.01); *B62M 6/50* (2013.01); *B62M 9/122* (2013.01); *B62M 6/90* (2013.01)

(58) Field of Classification Search
CPC ........ B62M 9/132; B62M 6/50; B62M 9/122; B62M 6/90; B62M 6/55; B62M 6/45; B62M 25/08; B62J 43/13; B62J 45/413; B62J 45/4151; B62J 45/4152; B62J 45/421
See application file for complete search history.

(56) References Cited

U.S. PATENT DOCUMENTS

| | | | |
|---|---|---|---|
| 5,992,553 A * | 11/1999 | Morrison | B62M 6/45 180/206.2 |
| 2018/0050761 A1 | 2/2018 | Tsuchizawa et al. | |
| 2018/0118211 A1 | 5/2018 | Tsuchizawa et al. | |
| 2018/0362115 A1* | 12/2018 | Tsuchizawa | B62M 6/50 |

(Continued)

FOREIGN PATENT DOCUMENTS

| | | |
|---|---|---|
| CN | 107428393 A | 1/2017 |
| CN | 104443246 B | 7/2017 |

(Continued)

*Primary Examiner* — Richard M Camby
(74) *Attorney, Agent, or Firm* — Global IP Counselors, LLP

(57) ABSTRACT

A transmission control system is configured to be used with a human-powered vehicle that includes a crank, a first rotation body rotated independently from the crank, a drive wheel, a second rotation body rotated independently from the drive wheel, a transfer body that transfers rotation force between the first and second rotation bodies, and a transmission that controls the transfer body and shifts a transmission ratio. The transmission control system includes a motor that drives the transfer body, a first detector that detects at least one of acceleration and vibration of the human-powered vehicle, and an electronic controller configured to control the motor in accordance with a detection result of the first detector upon generation of a shift request for the transmission in a state in which the drive wheel is rotated and a rotational angle of the crank is maintained in a predetermined range.

20 Claims, 8 Drawing Sheets

(56) References Cited

U.S. PATENT DOCUMENTS

| | | | |
|---|---|---|---|
| 2019/0118892 A1* | 4/2019 | Nishino | B62J 43/30 |
| 2019/0118903 A1* | 4/2019 | Nishino | B60T 8/00 |
| 2019/0127020 A1* | 5/2019 | Shahana | B62M 6/50 |
| 2019/0248444 A1* | 8/2019 | Katsuki | B62J 45/4151 |
| 2019/0291813 A1* | 9/2019 | Tsuchizawa | B62M 6/55 |

FOREIGN PATENT DOCUMENTS

| | | |
|---|---|---|
| JP | 10-511621 H | 11/1998 |
| JP | 2017-007610 A | 1/2017 |

* cited by examiner

TRANSMISSION CONTROL SYSTEM FOR USE WITH HUMAN-POWERED VEHICLE

CROSS-REFERENCE TO RELATED APPLICATIONS

This application claims priority to Japanese Patent Application No. 2018-156565, filed on Aug. 23, 2018. The entire disclosure of Japanese Patent Application No. 2018-156565 is hereby incorporated herein by reference.

BACKGROUND

Technical Field

The present invention generally relates to a transmission control system for use with a human-powered vehicle.

Background Information

Japanese Patent Publication No. 10-511621 (Patent document 1) discloses a transmission control system for use with a human-powered vehicle that controls a transmission in accordance with a predetermined condition and shifts a transmission ratio.

SUMMARY

The transmission control system for use with the human-powered vehicle controls the transmission to reduce the traveling load and the like. However, other conditions have not been considered.

One object of the present disclosure is to provide a transmission control system for use with a human-powered vehicle that is configured to suitably control the shifting by the transmission.

A transmission control system for use with a human-powered vehicle in accordance with a first aspect of the present disclosure includes a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio. The transmission control system comprises a motor, a first detector and an electronic controller. The motor is configured to drive the transfer body. The first detector is configured to detect at least one of acceleration and vibration of the human-powered vehicle. The electronic controller is configured to control the motor in accordance with a detection result of the first detector upon generation of a shift request for the transmission in a state in which the drive wheel is rotated and a rotational angle of the crank is maintained in a predetermined range.

In accordance with the transmission control system for use with the human-powered vehicle of the first aspect, the shifting by the transmission is suitably controlled even in a case in which the rotational angle of the crank is maintained in a predetermined range by controlling the motor in accordance with the detection result of the first detector.

In accordance with a second aspect of the present disclosure, the transmission control system according to the first aspect is configured so that the electronic controller is configured to not drive the motor while the transmission is in a state in which the drive wheel is rotated and the rotational angle of the crank is maintained in the predetermined range, and upon generation of a shift request for the transmission in any one of a case in which the acceleration is greater than or equal to a first value, a case in which a magnitude of the vibration is greater than or equal to a second value, and a case in which a duration time of the vibration is greater than or equal to a third value.

In accordance with the transmission control system for use with the human-powered vehicle of the second aspect, the motor is not driven in a situation that is not suitable for shifting.

In accordance with a third aspect of the present disclosure, the transmission control system according to the first aspect is configured so that the electronic controller is configured to control the motor so that the motor does not drive the drive wheel but drives the transfer body while the transmission is in a state in which the drive wheel is rotated and the rotational angle of the crank is maintained in the predetermined range, and upon generation of a shift request for the transmission in any one of a case in which the acceleration is less than a first value, a case in which a magnitude of the vibration is less than a second value, and a case in which a duration time of the vibration is less than a third value.

In accordance with the transmission control system for use with the human-powered vehicle of the third aspect, the transmission executes stable shifting since the motor is controlled to drive the transfer body in a case in which the acceleration is less than the first value, the magnitude of the vibration is less than the second value, or the duration time of the vibration is less than the third value. Furthermore, since the motor is driven so as not to drive the drive wheel, the human-powered vehicle is not propelled by the motor against the intention of the rider.

In accordance with a fourth aspect of the present disclosure, the transmission control system according to any one of the first to third aspects is configured so that the transmission control system further comprises a second detector that detects at least one of first information related to a state of a steering unit of the human-powered vehicle and second information related to a posture of the human-powered vehicle. The controller controls the motor in accordance with a detection result of the second detector upon generation of a shift request for the transmission in a state in which the drive wheel is rotated and the rotational angle of the crank is maintained in the predetermined range.

In accordance with the transmission control system for use with the human-powered vehicle of the fourth aspect, the shifting by the transmission is suitably controlled in accordance with at least one of the state of the steering unit and the posture of the human-powered vehicle.

A transmission control system for use with a human-powered vehicle in accordance with a fifth aspect of the present disclosure including a steering unit, a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio. The transmission control system comprises a motor, a second detector, and an electronic controller. The motor is configured to drive the transfer body. The second detector is configured to detect at least one of first information related to a state of the steering unit and second information related to a posture of the human-powered vehicle. The electronic controller is configured to control the motor in accordance with a detection result of the second detector upon generation of a shift request for the transmission in a state in which the drive wheel is rotated and a rotational angle of the crank is maintained in a predetermined range.

In accordance with the transmission control system for use with the human-powered vehicle of the fifth aspect, the shifting by the transmission is suitably controlled in accordance with at least one of the state of the steering unit and the posture of the human-powered vehicle.

In accordance with a sixth aspect of the present disclosure, the transmission control system according to the fourth or fifth aspect is configured so that the second information includes at least one of a roll angle of the human-powered vehicle, a yaw angle of the human-powered vehicle, and a pitch angle of the human-powered vehicle.

In accordance with the transmission control system for use with the human-powered vehicle of the sixth aspect, the shifting by the transmission is suitably controlled in accordance with at least one of the roll angle of the human-powered vehicle, the yaw angle of the human-powered vehicle, and the pitch angle of the human-powered vehicle.

In accordance with a seventh aspect of the present disclosure, the transmission control system according to any one of the fourth to sixth aspects is configured so that the first information includes a steering angle that includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle.

In accordance with the transmission control system for use with the human-powered vehicle of the seventh aspect, the shifting by the transmission is suitably controlled in accordance with the steering angle.

In accordance with an eighth aspect of the present disclosure, the transmission control system according to the sixth aspect is configured so that the first information includes a steering angle that includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle. The electronic controller is configured to not drive the motor while the transmission is in a state in which the drive wheel is rotated and the rotational angle of the crank is maintained in the predetermined range, and upon generation of a shift request for the transmission in at least one of a case in which the steering angle is greater than or equal to a first angle, a case in which a changing amount of the steering angle is greater than or equal to a first changing amount, a case in which the roll angle is greater than or equal to a second angle, a case in which a changing amount of the roll angle is greater than or equal to a second changing amount, a case in which the yaw angle is greater than or equal to a third angle, a case in which a changing amount of the yaw angle is greater than or equal to a third changing amount, a case in which a pitch angle is greater than or equal to a fourth angle, and a case in which a changing amount of the pitch angle is greater than or equal to a fourth changing amount.

In accordance with the transmission control system for use with the human-powered vehicle of the eighth aspect, the motor is not driven in a situation that is not suitable for shifting.

In accordance with a ninth aspect of the present disclosure, the transmission control system according to the sixth aspect is configured so that the first information includes a steering angle. The steering angle includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle. The electronic controller is configured to drive the motor while the transmission is in a state in which the drive wheel is rotated and the rotational angle of the crank is maintained in the predetermined range, and upon generation of a shift request for the transmission in at least one of a case in which the steering angle is less than a first angle, a case in which a changing amount of the steering angle is less than a first changing amount, a case in which the roll angle is less than a second angle, a case in which a changing amount of the roll angle is less than a second changing amount, a case in which the yaw angle is less than a third angle, a case in which a changing amount of the yaw angle is less than a third changing amount, a case in which a pitch angle is less than a fourth angle, and a case in which a changing amount of the pitch angle is less than a fourth changing amount.

In accordance with the transmission control system for use with the human-powered vehicle of the ninth aspect, the transmission executes stable shifting since the motor is driven in at least one of a case in which the steering angle is less than the first angle, the changing amount of the steering angle is less than the first changing amount, the roll angle is less than the second angle, the changing amount of the roll angle is the less than the second changing amount, the yaw angle is less than the third angle, the changing amount of the yaw angle is less than the third changing amount, and the pitch angle is less than the fourth angle, and a case in which the changing amount of the pitch angle is less than the fourth changing amount.

In accordance with a tenth aspect of the present disclosure, the transmission control system according to any one of the first to ninth aspects further comprises an electric actuator that actuates the transmission. The electronic controller is further configured to control the electric actuator. The controller is further configured to not actuate the transmission while the transmission is in a state in which the drive wheel is rotated and the rotational angle of the crank is maintained in the predetermined range, and upon generation of a shift request for the transmission in a case in which the controller does not drive the motor.

In accordance with the transmission control system for use with the human-powered vehicle of the tenth aspect, the transmission is not actuated in a situation that is not suitable for shifting.

A transmission control system for use with a human-powered vehicle in accordance with an eleventh aspect of the present disclosure includes a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio. The transmission control system comprises an electric actuator and an electronic controller. The electric actuator is configured to actuate the transmission. The electronic controller is configured not to actuate the transmission upon generation of a shift request for the transmission while the transmission is in a state in which the drive wheel is rotated and a rotational angle of the crank is maintained in a predetermined range.

In accordance with the transmission control system for use with the human-powered vehicle of the eleventh aspect, the transmission is not actuated in a situation that is not suitable for shifting. In the transmission control system for use with the human-powered vehicle in accordance with the eleventh aspect, the influence on the operation of the human-powered vehicle is reduced, for example, by actuating the transmission.

In accordance with a twelfth aspect of the present disclosure, the transmission control system for use with the human-powered vehicle according to the eleventh aspect further comprises a motor that drives the transfer body. The electronic controller is configured control the motor to drive the transfer body while the transmission is in a state in which the drive wheel is rotated and the rotational angle of the crank is maintained in the predetermined range, and upon generation of a shift request for the transmission in a case in which the electronic controller actuates the transmission.

In accordance with the transmission control system for use with the human-powered vehicle of the twelfth aspect, in the transmission control system including the motor, in a state in which the rotational angle of the crank is maintained in the predetermined range, the shifting is suitably performed by the transmission because the motor is controlled to drive the transfer body upon generation of a shift request for the transmission in a case in which the controller actuates the transmission.

In accordance with a thirteenth aspect of the present disclosure, the transmission control system for use with the human-powered vehicle according to any one of the first to tenth aspects and the twelfth aspect is configured so that the motor is connected to a transmission path of human driving force input to the human-powered vehicle at an upstream side of the transfer body.

In accordance with the transmission control system for use with the human-powered vehicle of the thirteenth aspect, the output torque of the motor is suitably transmitted to the transfer body.

In accordance with a fourteenth aspect of the present disclosure, in the transmission control system for use with the human-powered vehicle according to any one of the first to tenth aspects, twelfth aspect, and thirteenth aspect, the motor is configured to assist in propulsion of the human-powered vehicle.

In accordance with the transmission control system for use with the human-powered vehicle of the fourteenth aspect, the motor assists the propulsion of the human-powered vehicle.

In accordance with a fifteenth aspect of the present disclosure, the transmission control system for use with the human-powered vehicle according to the fourteenth aspect is configured so that the electronic controller is configured to control the motor in accordance with human driving force input to the human-powered vehicle in a case in which the crank is rotating in a predetermined direction.

In accordance with the transmission control system for use with the human-powered vehicle of the fifteenth aspect, the propulsion of the human-powered vehicle is suitably assisted in a case in which the crank is rotating in a predetermined direction.

In accordance with a sixteenth aspect of the present disclosure, the transmission control system for use with the human-powered vehicle according to any one of the first to fifteenth aspects is configured so that the predetermined range includes an angle separated by 90 degrees from an angle at which a crank arm of the crank is located at a top or bottom dead center.

In accordance with the transmission control system for use with the human-powered vehicle of the sixteenth aspect, the shifting performed by the transmission is suitably controlled in a case in which the crank arm is maintained in a range including an angle separated by 90 degrees from the angle at which the crank arm is located at the top or bottom dead center.

In accordance with a seventeenth aspect of the present disclosure, the transmission control system for use with the human-powered vehicle according to any one of the first to fifteenth aspects is configured so that the predetermined range is less than or equal to 30 degrees.

In accordance with the transmission control system for use with the human-powered vehicle of the seventeenth aspect, the shifting by the transmission is suitably controlled in a case in which the crank arm is maintained in a range within 30 degrees.

In accordance with an eighteenth aspect of the present disclosure, the transmission control system for use with the human-powered vehicle according to any one of the first to seventeenth aspects further comprises a transmission operation portion that outputs the shift request.

In accordance with the transmission control system for use with the human-powered vehicle of the eighteenth aspect, the transmission operation portion suitably generates a shift request.

In accordance with a nineteenth aspect of the present disclosure, the transmission control system for use with the human-powered vehicle according to any one of the first to eighteenth aspects is configured so that the electronic controller is configured to generate the shift request in accordance with at least one of a riding state of the human-powered vehicle and a riding environment of the human-powered vehicle.

In accordance with the transmission control system for use with the human-powered vehicle of the nineteenth aspect, a shift request is suitably generated in accordance with at least one of the riding state of the human-powered vehicle and the riding environment of the human-powered vehicle.

In accordance with a twentieth aspect of the present disclosure, the transmission control system for use with the human-powered vehicle according to any one of the first to nineteenth aspects is configured so that the first rotation body and the second rotation body each include a sprocket, the transfer body includes a chain, and the transmission includes a derailleur.

In accordance with the transmission control system for use with the twentieth aspect, the first rotation body and the second rotation body each including the sprocket suitably controls the shifting by the transmission of the transmission control system including the transfer body including the chain and the transmission including the derailleur.

The transmission control system for use with a human-powered vehicle in accordance with the present disclosure suitably controls the shifting by the transmission.

BRIEF DESCRIPTION OF THE DRAWINGS

Referring now to the attached drawings which form a part of this original disclosure.

DETAILED DESCRIPTION OF EMBODIMENTS

Figure 1:
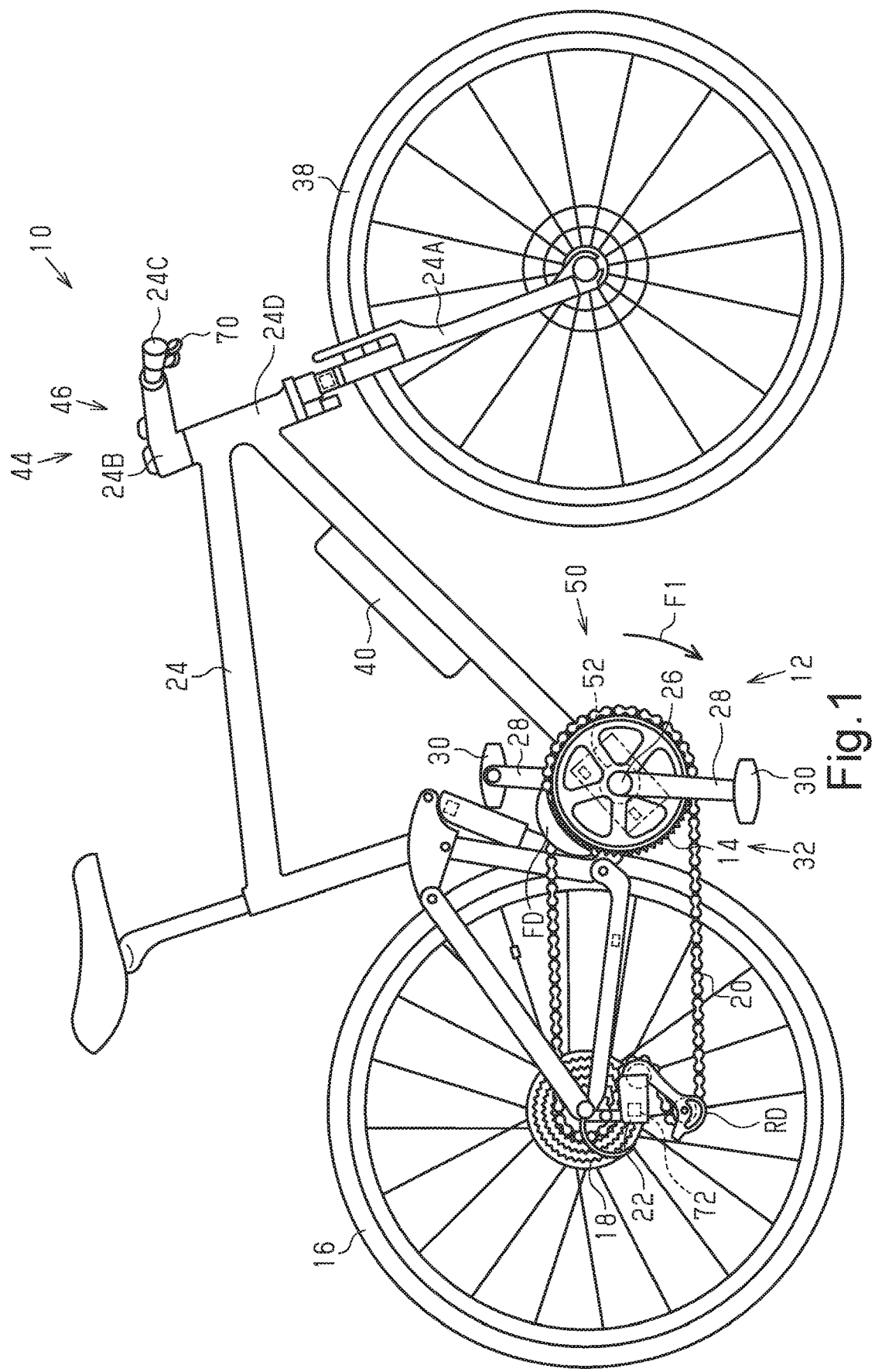
FIG. 1 is a elevational side view of a human-powered vehicle including a transmission control system for use with the human-powered vehicle in accordance with a first embodiment.
Figure 2:
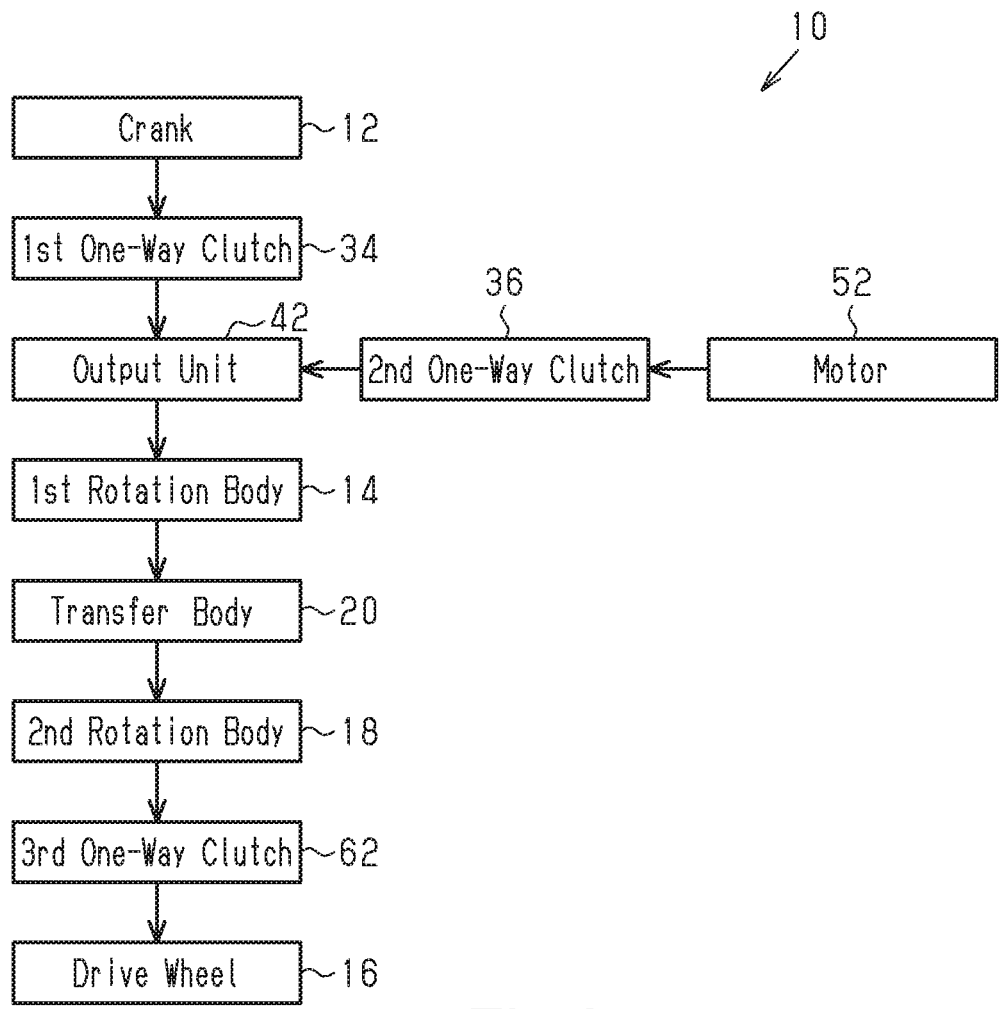
FIG. 2 is a schematic view showing a power transmission path of the human-powered vehicle of FIG. 1.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. Also, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

First Embodiment

A transmission control system 50 for use with a human-powered vehicle 10 in accordance with a first embodiment will now be described with reference to FIGS. 1 to 5. Hereinafter, the transmission control system 50 of the human-powered vehicle 10 will simply be referred to as the transmission control system 50. The transmission control system 50 is provided on the human-powered vehicle 10. The human-powered vehicle 10 is a vehicle that is configured to be driven by at least a human driving force H. The human-powered vehicle 10 includes, for example, a bicycle. There is no limit to the number of wheels of the human-powered vehicle 10. For example, the human-powered vehicle 10 can be a unicycle or a vehicle having three or more wheels. The human-powered vehicle 10 includes various types of bicycles such as a mountain bike, a road bike, a city bike, a cargo bikes, and a recumbent bike, as well as an electric bicycle (E-bike). The electric bicycle includes an electric assist bicycle of which propulsion is assisted by an electric motor. In the embodiments described hereafter, the human-powered vehicle 10 will be referred to as a bicycle.

The human-powered vehicle 10 includes a crank 12, a first rotation body 14, a drive wheel 16, a second rotation body 18, a transfer body 20, and a transmission 22. The first rotation body 14 is rotatable independently from the crank 12. The second rotation body 18 is rotatable independently from the drive wheel 16. The transfer body 20 transfers rotation force between the first rotation body 14 and the second rotation body 18. The transmission 22 is configured to control the transfer body 20 and shifts a transmission ratio. The human-powered vehicle 10 further includes a frame 24. A human driving force H is input to the crank 12. The crank 12 includes a crankshaft 26 rotatable relative to the frame 24 and a pair of crank arms 28. The crank arms 28 are respectively provided on two axial ends of the crankshaft 26. A pedal 30 is connected to each of the crank arms 28. The drive wheel 16 is driven by the rotation of the crank 12. The drive wheel 16 is supported by the frame 24. A drive mechanism 32 links the crank 12 and the drive wheel 16. The drive mechanism 32 includes the first rotation body 14 coupled to the crankshaft 26. The crankshaft 26 and the first rotation body 14 are coupled by a first one-way clutch 34. The first one-way clutch 34 is configured to rotate the first rotation body 14 forward in a case in which the crank 12 rotates forward and not to rotate the first rotation body 14 backward in a case in which the crank 12 rotates backward. The first rotation body 14 is rotated independently from the crank 12 by the first one-way clutch 34. The first rotation body 14 includes a sprocket or a pulley. The drive mechanism 32 further includes the transfer body 20 and the second rotation body 18. The transfer body 20 transfers the rotation force of the first rotation body 14 to the second rotation body 18. The transfer body 20 includes, for example, a chain or a belt.

The second rotation body 18 is connected to the drive wheel 16. The second rotation body 18 includes a sprocket or a pulley. Preferably, a second one-way clutch 36 is provided between the second rotation body 18 and the drive wheel 16. The second one-way clutch 36 is configured to rotate the drive wheel 16 forward in a case in which the second rotation body 18 rotates forward and not to rotate the drive wheel 16 backward in a case in which the second rotation body 18 rotates backward. The second rotation body 18 is rotatable independently from the drive wheels 16 by the second one-way clutch 36.

The human-powered vehicle 10 includes a front wheel and a rear wheel. The front wheel is attached to the frame 24 by a front fork 24A. A handlebar 24C is connected to the front fork 24A by a stem 24B. In the description hereafter, the rear wheel is referred to as the drive wheel 16 and the front wheel is referred to as a steering wheel 38. However, the front wheel can be the drive wheel 16 and the rear wheel can be the steering wheel 38.

The human-powered vehicle 10 further includes a battery 40. The battery 40 includes one or more battery cells. The battery cell includes a rechargeable battery. The battery 40 is provided in the human-powered vehicle 10 and supplies electric power to other electric parts, such as a motor 52 and an electronic controller 56 of the transmission control system 50, which are electrically connected to the battery 40. Hereinafter, the electronic controller 56 will simply be referred to as the controller 56. Also, the human-powered vehicle 10 further includes a first detector 54 that is configured to detect at least one of acceleration and vibration of the human-powered vehicle 10. Here, the term "detector" is a device(s) that detects information relating to the human-powered vehicle 10 and does not include a human. The battery 40 and the first detector 54 are connected to the controller 56 to communicate with the controller 56 through a wired or wireless connection. Here, the battery 40 is configured to communicate with the controller 56, for example, through power line communication (PLC) in the case of a wired connection. The battery 40 can be coupled to the outside of the frame 24 or be at least partially accommodated inside the frame 24.

The transmission 22 changes a transmission ratio which is a ratio of the rotational speed of the drive wheel 16 to the rotational speed N of the crank 12. The transmission 22 is configured to change the transmission ratio in a stepwise manner. The transmission 22 can be configured to change the transmission ratio in a stepless manner. Preferably, the first rotation body 14 and the second rotation body 18 each include at least one sprocket. Also, preferably, the transfer body 20 includes a chain. Further, preferably, the transmission 22 includes at least one derailleur. In the present embodiment, at least one of the first rotation body 14 and the second rotation body 18 includes a plurality of sprockets. In the present embodiment, the first rotation body 14 includes one sprocket, and the second rotation body 18 includes a plurality of sprockets. In the present embodiment, the transmission 22 includes a front derailleur FD in a case in which the first rotation body 14 includes a plurality of front sprockets, and includes a rear derailleur RD in a case in which the second rotation body 18 includes a plurality of rear sprockets.

The transmission control system 50 is used in the human-powered vehicle 10. The transmission control system 50 includes the motor 52, the first detector 54, and the controller 56. Basically, the motor 52 is configured to drive the transfer body 20, and the first detector 54 is configured to detects at least one of acceleration and vibration of the human-powered vehicle 10. The controller 56 is configured to control the motor 52 based on a detection result of the first detector 54.

The controller 56 includes at least one processor that executes a predetermined control program. The processor includes, for example, a central processing unit (CPU) or a micro-processing unit (MPU). The controller 56 can include one or more microcomputers. The controller 56 can include a plurality of processors located at separate positions. For example, the electronic controller 62 is formed of one or more semiconductor chips that are mounted on a printed circuit board. The term "electronic controller" as used herein refers to hardware that executes a software program, and does not include a human. The transmission control system 50 further includes memory or storage 58. The storage 58 stores various control programs and information used for various control processes. The storage 66 is any computer storage device or any computer readable medium with the sole exception of a transitory, propagating signal. The storage 58 includes, for example, a nonvolatile memory and a volatile memory. The controller 56 and the storage 58 are provided on, for example, the same housing as the motor 52.

The transmission control system 50 further includes a drive circuit 60 of the motor 52. Preferably, the motor 52 and the drive circuit 60 are provided on the same housing. The drive circuit 60 controls the electric power supplied from the battery 40 to the motor 52. The drive circuit 60 is connected to the controller 56 to communicate with the controller 56 through a wired or wireless connection. The drive circuit 60 drives the motor 52 in accordance with a control signal from the controller 56. The drive circuit 60 includes an inverter circuit. The motor 52 is configured to assist in propulsion of the human-powered vehicle 10. The motor 52 includes an electric motor. The motor 52 is provided in a power transmission path of the human driving force H extending from the pedal 30 to the rear wheel to transmit rotation. The motor 52 is connected to the upstream side of the transfer body 20 in the transmission path of the human driving force H input to the human-powered vehicle 10. In one example, the motor 52 is coupled to a power transmission path from the crankshaft 26 to the first rotation body 14. The motor 52 is provided to transmit the output torque to an output unit 42 provided between the first one-way clutch 34 and the first rotation body 14. The output unit 42 rotates integrally with the first rotation body 14. The motor 52 is provided on the frame 24 of the human-powered vehicle 10. Preferably, a third one-way clutch 62 is provided on the power transmission path between the motor 52 and the crankshaft 26 so that the motor 52 is not rotated by the rotation force of the crank 12 in a case in which the crankshaft 26 is rotated in the direction in which the human-powered vehicle 10 moves forward. The housing on which the motor 52 and the drive circuit 60 are provided can be provided with components other than the motor 52 and the drive circuit 60, and for example, can be provided with a speed reducer that reduces the speed of the rotation generated by the motor 52 before outputting the rotation. In a case in which the speed reducer is provided in the housing provided with the motor 52 and the drive circuit 60, the driving force of the motor 52 is transmitted to the output unit 42 through the speed reducer.

The transmission control system 50 further includes a crank rotation sensor 64, a vehicle speed sensor 66, and a torque sensor 68. The crank rotation sensor 64 is used to detect the rotational speed N of the crank 12 of the human-powered vehicle 10. The crank rotation sensor 64 is attached to, for example, the frame 24 of the human-powered vehicle 10 or the housing in which the motor 52 is provided. The crank rotation sensor 64 is configured to include a magnetic sensor that outputs a signal corresponding to the intensity of a magnetic field. An annular magnet, the magnetic field intensity of which changes in the circumferential direction, is provided on the crankshaft 26 or the power transmission path between the crankshaft 26 and the first rotation body 14. The crank rotation sensor 64 is connected to the controller 56 to communicate with the controller 56 through a wired or wireless connection. The crank rotation sensor 64 outputs a signal corresponding to the rotational speed N of the crank 12 to the controller 56. The crank rotation sensor 64 can be provided on a member that rotates integrally with the crankshaft 26 in the power transmission path of the human driving force H from the crankshaft 26 to the first rotation body 14. The crank rotation sensor 64 can be used to detect a vehicle speed V of the human-powered vehicle 10. In this case, the controller 56 calculates the rotational speed of the drive wheel 16 in accordance with the rotational speed N of the crank 12 detected by the crank rotation sensor 64 and the transmission ratio to obtain the vehicle speed V of the human-powered vehicle 10. Information relating to the transmission ratio is stored in advance in the storage 58.

The controller 56 can calculate the transmission ratio in accordance with the vehicle speed V of the human-powered vehicle 10 and the rotational speed N of the crank 12. In this case, information relating to the circumferential length of the drive wheel 16, the diameter of the drive wheel 16, or the radius of the drive wheel 16 is stored in advance in the storage 58. The transmission 22 can include a shift sensor. The shift sensor is configured to detect the current shift stage of the transmission 22. The shift sensor is electrically connected to the controller 56 through a wired or wireless connection to transmit a detection result of the shift sensor to the controller 56. The relationship between the shift stage and the transmission ratio is stored in advance in the storage 58. The controller 56 is thus configured to detect the current transmission ratio from the detection result of the shift sensor. The controller 56 is configured to calculate the rotational speed N of the crank 12 by dividing the rotational speed of the drive wheel 16 by the transmission ratio. In this case, the vehicle speed sensor 66 and the shift sensor can be used as the crank rotation sensor 64.

The vehicle speed sensor 66 is used to detect the rotational speed of the wheel. The vehicle speed sensor 66 is electrically connected to the controller 56 through a wired or wireless connection. The vehicle speed sensor 66 is connected to the controller 56 to communicate with the controller 56 through a wired or wireless connection. The vehicle speed sensor 66 outputs a signal corresponding to the rotational speed of the wheel to the controller 56. The controller 56 calculates the vehicle speed V of the human-powered vehicle 10 from the rotational speed of the wheel. The controller 56 stops the motor 52 in a case in which the vehicle speed V becomes greater than or equal to a predetermined value. The predetermined value is, for example, 25 kilometers per hour or 45 kilometers per hour. Preferably, the vehicle speed sensor 66 includes a magnetic reed forming a reed switch or a Hall element. The vehicle speed sensor 66 can be mounted on a chain stay of the frame 24 to detect a magnet attached to the rear wheel or can be provided on the front fork 24A to detect a magnet attached to the front wheel. In another example, the vehicle speed sensor 66 includes a GPS receiver. The controller 56 can detect the vehicle speed V of the human-powered vehicle 10 in accordance with the GPS information acquired by the GPS receiver, the map information recorded in advance in the storage 58, and the time. Preferably, the controller 56 includes a timekeeping circuit for measuring time.

The torque sensor 68 is used to detect a torque TH of the human driving force H. The torque sensor 68 is provided, for example, in the housing in which the motor 52 is provided. The torque sensor 68 detects the torque TH of the human driving force H input to the crank 12. The torque sensor 68 is provided, for example, on the upstream side of the first one-way clutch 34 in the power transmission path. The torque sensor 68 includes a strain sensor, a magnetostrictive sensor, or the like. The strain sensor includes a strain gauge. Preferably, in a case in which the torque sensor 68 includes a strain sensor, the strain sensor is provided on an outer circumferential portion of the rotation body included in the power transmission path. The torque sensor 68 can include a wireless or wired communicator. The communicator of the torque sensor 68 is configured to communicate with the controller 56.

The controller 56 controls the motor 52 in accordance with the human driving force H input to the human-powered vehicle 10 in a case in which the crank 12 is rotating in the predetermined direction F1. The predetermined direction F1 is the direction in which the crank 12 is rotated to move the human-powered vehicle 10 forward.

For example, the controller 56 controls the motor 52 so that the assist force generated by the motor 52 to the human driving force H becomes equal to a predetermined ratio A. The controller 56 can control the motor 52 so that, for example, an output torque TM of the assist force generated by the motor 52 to the torque TH of the human driving force H of the human-powered vehicle 10 becomes equal to a predetermined ratio A. The controller 56 controls the motor 52 in one control mode selected from, for example, a plurality of control modes having different ratios A of the output of the motor 52 to the human driving force H. A torque ratio AT of the output torque TM of the motor 52 to the torque TH of the human driving force H of the human-powered vehicle 10 will also be referred to as the ratio A. For example, the controller 56 can control the motor 52 so that the power WM (watt) of the motor 52 to the power WH (watt) of the human driving force H becomes equal to a predetermined ratio A. The power WH of the human driving force H is calculated by multiplying the human driving force H and the rotational speed N of the crank 12. In a case in which the output of the motor 52 is input to the power path of the human driving force H through the speed reducer, the output of the speed reducer corresponds to the output of the motor 52. The controller 56 outputs a control command to the drive circuit 60 of the motor 52 in accordance with the torque TH or the power WH of the human driving force H. The control command includes, for example, a torque command value.

Figure 4:
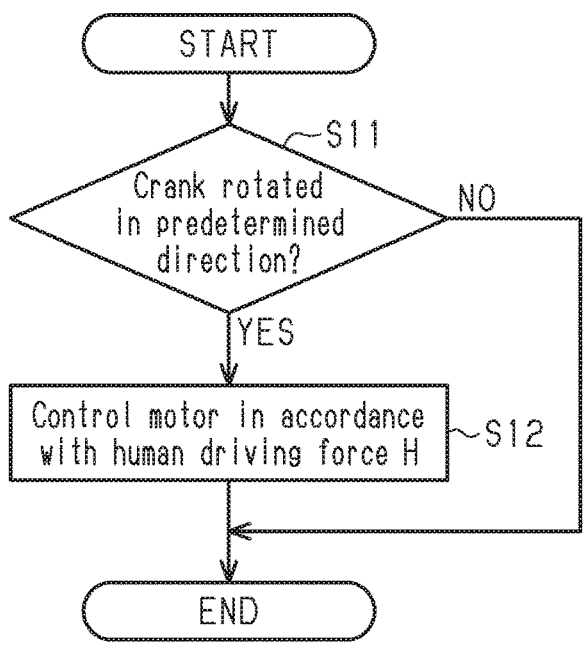
FIG. 4 is a flowchart of a process for driving a motor in accordance with a human driving force executed by an electronic controller of FIG. 3.

A process for controlling the motor 52 in accordance with the human driving force H will now be described with reference to FIG. 4. In a case where electric power is supplied to the controller 56, the controller 56 starts the process and proceeds to step S11 of the flowchart shown in FIG. 4.

In step S11, the controller 56 determines whether or not the crank 12 is rotating in the predetermined direction F1. The controller 56 can determine that the crank 12 is rotating in the predetermined direction F1, for example, in at least one of a case in which the crank 12 is rotating at a predetermined speed or greater in the predetermined direction F1 and a case in which the crank 12 is rotated by a predetermined angle or greater in the predetermined direction F1 over a predetermined time. In a case in which the crank 12 is not rotating in the predetermined direction F1, the controller 56 ends the process. In a case in which the crank 12 is rotating in the predetermined direction F1, the controller 56 proceeds to step S12.

In step S12, the controller 56 controls the motor 52 in accordance with the human driving force H and then ends the process. The controller 56 controls, for example, the motor 52 so that the ratio A corresponds to the selected control mode of the motor 52.

Preferably, the transmission control system 50 further includes a transmission operation portion 70 that outputs a shift request. The transmission operation portion 70 is connected to the controller 56 to communicate with the controller 56 through a wired or wireless connection. The transmission operation portion 70 is configured to communicate with the controller 56 through, for example, power line communication (PLC). Each transmission operation portion 70 includes, for example, an operation member, a detector that detects the movement of the operation member, and an electric circuit that communicates with the controller 56 in accordance with an output signal of the detector. The detector transmits the output signal to the controller 56 as the user operates the operation member. The operation member and the detector that detects the movement of the operation member are configured to include at least one of a contact switch, a magnetic sensor, and a touch panel. The transmission operation portion 70 is provided, for example, on the handlebar 24C.

The controller 56 can generate a shift request in accordance with at least one of the riding state of the human-powered vehicle 10 and the riding environment of the human-powered vehicle 10. The riding state of the human-powered vehicle 10 and the riding environment of the human-powered vehicle 10 includes, for example, at least one of the rotational speed N of the crank 12, the human driving force H, the vehicle speed V, the road surface condition of the road on which the human-powered vehicle 10 is traveling, the road surface gradient of the traveling road of the human-powered vehicle 10, and the traveling resistance of the human-powered vehicle 10. The transmission control system 50 can further include a detector that detects the riding state of the human-powered vehicle 10 and the riding environment of the human-powered vehicle 10. The controller 56 generates a shift request, for example, in a case in which a parameter reflecting the riding state of the human-powered vehicle 10 and the riding environment of the human-powered vehicle 10 exceeds a predetermined value. In one example, the controller 56 generates a shift request for increasing the transmission ratio in a case in which the rotational speed N of the crank 12 is larger than the first speed N1 and in a case in which the transmission ratio is not the maximum, and the controller 56 generates a shift request for decreasing the transmission ratio in a case in which the rotational speed N of the crank 12 is smaller than the second speed N2 and in a case in which the transmission ratio is not the minimum. In another example, the controller 56 generates a shift request for decreasing the transmission ratio in a case in which the human driving force H is larger than the first driving force H1 and in a case in which the transmission ratio is not the minimum, and the controller 56 generates a shift request for increasing the transmission ratio in a case in which the human driving force H is smaller than the second driving force H2 and in a case in which the transmission ratio is not the maximum.

Preferably, the transmission control system 50 further includes an electric actuator 72 for actuating the transmission 22. The controller 56 controls the electric actuator 72. The electric actuator 72 performs a shift operation with the transmission 22. The transmission 22 is controlled by the controller 56. The electric actuator 72 is connected to the controller 56 to communicate with the controller 56 through a wired or wireless connection. The electric actuator 72 is configured to communicate with the controller 56 through, for example, the power line communication (PLC). The controller 56 transmits a control signal to the electric actuator 72 in accordance with the shift request. The electric actuator 72 performs a shift operation with the transmission 22 in accordance with a control signal from the controller 56.

The first detector 54 is provided, for example, on the frame 24, the transmission 22, or the housing of the motor 52. The first detector 54 includes, for example, an inclination sensor. The inclination sensor detects the inclination angle of the human-powered vehicle 10. The inclination sensor includes, for example, a gyro sensor. Preferably, the gyro sensor includes a three-axis gyro sensor. Preferably, the gyro sensor is configured to detect the yaw angle of the human-powered vehicle 10, the roll angle of the human-powered vehicle 10, and the pitch angle of the human-powered vehicle 10. Preferably, the three axes of the gyro sensor with respect to the human-powered vehicle 10 lie in the front and back direction, the left and right direction, and the up and down direction of the human-powered vehicle 10. The gyro sensor can include a single-axis gyro sensor or a two-axis gyro sensor. The first detector 54 can include an acceleration sensor. The acceleration sensor detects the acceleration in at least one of the front and back direction, the left and right direction, and the up and down direction of the human-powered vehicle 10.

The controller 56 controls the motor 52 in accordance with a detection result of the first detector 54 upon generation of a shift request for the transmission 22 in a state in which the drive wheel 16 is rotated and a rotational angle CA of the crank 12 is maintained in a predetermined range WX. Preferably, the predetermined range WX includes an angle separated by 90 degrees from an angle at which the crank arm 28 of the crank 12 is located at a top or bottom dead center. The top dead center corresponds to the rotational angle CA of the crank 12 in a state in which the crank arm 28 extends toward the upper side in the vertical direction from the rotation axis center of the crankshaft 26 in a case in which the human-powered vehicle 10 is traveling on level ground. The bottom dead center corresponds to the rotational angle CA of the crank 12 in a state in which the crank arm 28 extends toward the lower side in the vertical direction from the rotation axis center of the crankshaft 26 in a case in which the human-powered vehicle 10 is traveling on level ground. Preferably, the predetermined range WX is within 30 degrees. The rotational angle CA at which the crank arm 28 of the crank 12 is located at the top or bottom dead centers can be fixed in advance relative to the frame 24 or can be corrected in accordance with the pitch angle of the human-powered vehicle 10.

Preferably, the controller 56 does not drive the drive wheel 16 and controls the motor 52 to drive the transfer body 20 in a case in which a shift request for the transmission 22 is generated and the acceleration D is less than the first value DX, the magnitude B of the vibration is less than the second value BX, or the duration time T of the vibration is less than the third value TX in a state in which the drive wheel 16 is rotated and the rotational angle CA of the crank 12 is maintained in the predetermined range WX. The power transmission path from the motor 52 to the drive wheel 16 includes a second one-way clutch 36. Therefore, by driving the motor 52 so that the rotational speed of the second rotation body 18 becomes lower than the rotational speed of the drive wheel 16 while the drive wheel 16 is rotating, the drive wheel 16 is not rotated and the transfer body 20 is driven. Since the power transmission path from the crank 12 to the output unit 42 includes the first one-way clutch 34, the crank 12 is not driven by the motor 52 even if the transfer body 20 is driven by the motor 52. A state in which the rotational angle CA of the crank 12 is maintained in the predetermined range WX includes a first state in which the rotational angle CA of the crank 12 is completely maintained in the predetermined range WX or a second state in which the rotational angle CA of the crank 12 is moved from within the predetermined range WX to the outside of the predetermined range WX for a short time and returned to the predetermined range WX. The controller 56 determines the rotational angle CA of the crank 12 in predetermined cycles, and the controller 56 determines the second state in a case in which the rotational angle CA of the crank 12 is outside the predetermined range WX in only one or some of the plurality of determinations.

Preferably, the controller 56 does not drive the motor 52 in a case in which a shift request for the transmission 22 is generated and the acceleration D is greater than or equal to the first value DX, the magnitude B of the vibration is greater than or equal to the second value BX, or the duration time T of the vibration is greater than or equal to the third value TX in a state in which the drive wheel 16 is rotated and the rotational angle CA of the crank 12 is maintained in the predetermined range WX. For example, in a case in which the transmission 22 includes a rear derailleur, the second rotation body 18 is rotated by the motor 52 driving the transfer body 20 so that the transmission 22 suitably executes the shift operation. Vibration inhibits the shift operation of the transmission 22. The controller 56 drives the motor 52 in a case in which the acceleration D is less than the first value DX, the magnitude B of the vibration is less than the second value BX, or the duration time T of the vibration is less than the third value TX so that the transmission 22 performs a shift operation in a case in which vibration is not likely to inhibit the shift operation. Vibration is likely to inhibit the shift operation in a case in which the acceleration D is greater than or equal to the first value DX, the magnitude B of the vibration is greater than or equal to the second value BX, or the duration time T of the vibration is greater than or equal to the third value TX. The controller 56 does not drive the motor 52 and does not cause the shift operation by the transmission 22 to be performed in a case in which the vibration is likely to inhibit the shift operation.

In a case in which the first detector 54 includes a gyro sensor, the magnitude B of the vibration corresponds to at least one of the magnitude of the change in the inclination angle and the change speed of the inclination angle. In a case in which the first detector 54 includes a gyro sensor, the duration time T of the vibration corresponds to the time in which the inclination angle repeatedly increases and decreases. In a case in which the first detector 54 includes an acceleration sensor, the magnitude B of the vibration corresponds to the magnitude of the acceleration. In a case in which the first detector 54 includes an acceleration sensor, the duration time T of the vibration corresponds to the time in which the acceleration repeatedly changes between a positive value and a negative value. In a case in which the human-powered vehicle 10 includes a suspension device, the first detector 54 can include a suspension state sensor that detects the state of the suspension device. The suspension state sensor detects at least one of a stroke amount of the suspension device and a fluid state of the suspension device. The first detector 54 can include a load sensor that detects the load applied to an axle of at least one of the front wheel and the rear wheel.

The human-powered vehicle 10 includes a steering unit 44. Preferably, the transmission control system 50 further includes a second detector 74 that detects at least one of first information related to the state of the steering unit 44 and second information related to the posture of the human-powered vehicle 10. The steering unit 44 includes at least one of the handlebar 24C, the stem 24B, and the front fork 24A. The handlebar 24C and the stem 24B form a handlebar 46.

The first information includes a steering angle S, and the steering angle S includes at least one of an angle of the handlebar 46 of the human-powered vehicle 10 relative to the frame 24 of the human-powered vehicle 10, an angle of the steering wheel of the human-powered vehicle 10 relative to the frame 24 of the human-powered vehicle 10, and an angle of the front fork 24A of the human-powered vehicle 10 relative to the frame 24 of the human-powered vehicle 10. In a case in which the second detector 74 detects the first information, the second detector 74 detects at least one of the angle of the handlebar 46 relative to the frame 24, the angle of the steering wheel 38 relative to the frame 24, and the angle of the front fork 24A relative to the frame 24. The second detector 74 is provided, for example, on the head tube 24D of the frame 24 and detects the rotational angle of the front fork 24A relative to the head tube 24D. The second detector 74 includes, for example, at least one of a rotary encoder and a rotary potentiometer.

The second information includes at least one of the roll angle of the human-powered vehicle 10, the yaw angle of the human-powered vehicle 10, and the pitch angle of the human-powered vehicle 10. In a case in which the second detector 74 detects the second information, the second detector 74 includes, for example, an inclination sensor. The inclination sensor of the second detector 74 has a configuration similar to the inclination sensor of the first detector 54. Although the inclination sensor of the first detector 54 can be used as the inclination sensor of the second detector 74, the inclination sensor of the second detector 74 can be configured separately from the inclination sensor of the first detector 54.

Preferably, the controller 56 controls the motor 52 in accordance with the detection result of the second detector 74 upon generation of a shift request for the transmission 22 in a state in which the drive wheel 16 is rotated and the rotational angle CA of the crank 12 is maintained in a predetermined range WX.

Preferably, in a state in which the drive wheel 16 is rotated and the rotational angle CA of the crank 12 is maintained in a predetermined range the controller 56 drives the motor 52 if a shift request for the transmission 22 is generated in at least one of a case in which the steering angle S is less than the first angle SX, a case in which the changing amount of the steering angle S is less than the first changing amount, a case in which the roll angle is less than the second angle, a case in which the changing amount of the roll angle is less than the second changing amount, a case in which the yaw angle is less than the third angle, a case in which the changing amount of the yaw angle is less than the third changing amount, a case in which the pitch angle is less than the fourth angle, and a case in which the changing amount of the pitch angle is less than the fourth changing amount.

A process for controlling the motor 52 and the transmission 22 in a case in which a shift request is generated will now be described with reference to FIG. 5. In a case where electric power is supplied to the controller 56, the controller 56 starts the process and proceeds to step S21 of the flowchart shown in FIG. 5.

In step S21, the controller 56 determines whether or not the drive wheel 16 is rotated and the rotational angle CA of the crank 12 is in a predetermined range WX. In a case in which the drive wheel 16 is rotated and the rotational angle CA of the crank 12 is not in the predetermined range WX, the controller 56 ends the process. In a case in which the drive wheel 16 is rotated and the rotational angle CA of the crank 12 is in the predetermined range WX, the controller 56 proceeds to step S22.

In step S22, the controller 56 determines whether or not a shift request has been generated. In a case in which a shift request has not been generated, the controller 56 ends the process. In a case in which the shift request has been generated, the controller 56 proceeds to step S27.

In step S27, the controller 56 determines whether shifting can be performed in accordance with the shift request. In a case in which the current transmission ratio is not the minimum transmission ratio or the maximum transmission ratio, the controller 56 determines that shifting can be performed upon generation of a shift request. Upon generation of a shift request for decreasing the transmission ratio in a case in which the current transmission ratio is the minimum transmission ratio, the controller 56 determines that shifting cannot be performed. Upon generation of a shift request for increasing the transmission ratio in a case in which the current transmission ratio is the minimum transmission ratio, the controller 56 determines that shifting can be performed. Upon generation of a shift request for increasing the transmission ratio in a case in which the current transmission ratio is the maximum transmission ratio, the controller 56 determines that shifting cannot be performed. Upon generation of a shift request for decreasing the transmission ratio in a case in which the current transmission ratio is the maximum transmission ratio, the controller 56 determines that shifting can be performed. If determining that shifting can be performed, then the controller 56 proceeds to step S23, and if determining that shifting cannot be performed, then the controller 56 ends the process.

In step S23, the controller 56 determines whether or not the first condition is satisfied. The first condition is satisfied in a case in which the acceleration D is less than the first value DX, the magnitude B of the vibration is less than the second value BX, or the duration time T of the vibration is less than the third value TX. In a case in which the first condition has not been satisfied, the controller 56 ends the process. In a case in which the first condition has been satisfied, the controller 56 proceeds to step S24.

In step S24, the controller 56 determines whether or not the second condition is satisfied. The second condition is satisfied in at least one of a case in which the steering angle S is less than the first angle SX, a case in which the changing amount of the steering angle S is less than the first changing amount, a case in which the roll angle is less than the second angle, a case in which the changing amount of the roll angle is less than the second changing amount, a case in which the yaw angle Is less than the third angle, a case in which the changing amount of the yaw angle is less than the third changing amount, the pitch angle is less than the fourth angle, a case in which and the changing amount of the pitch angle is less than the fourth changing amount. In a case in which the second condition has not been satisfied, the controller 56 ends the process. In a case in which the second condition has been satisfied, the controller 56 proceeds to step S25.

In step S25, the controller 56 controls the motor 52 so that the drive wheel 16 is driven and the transfer body 20 is not driven, and proceeds to step S26. In step S26, the controller 56 actuates the transmission 22 and ends the process. Specifically, the controller 56 actuates the transmission 22 in accordance with the shift request determined in step S22.

The controller 56 can stop driving the motor 52 in a case in which a shift operation of the transmission 22 has been completed. The controller 56 can drive the electric actuator 72 and determine that a shift operation of the transmission 22 has been completed in a case in which a predetermined time has elapsed from the point of time the shift operation of the transmission 22 is operated. The controller 56 can determine the completion of the shift operation of the transmission 22 in accordance with the output of the shift sensor that detects the state of the transmission 22.

Second Embodiment

Figure 3:
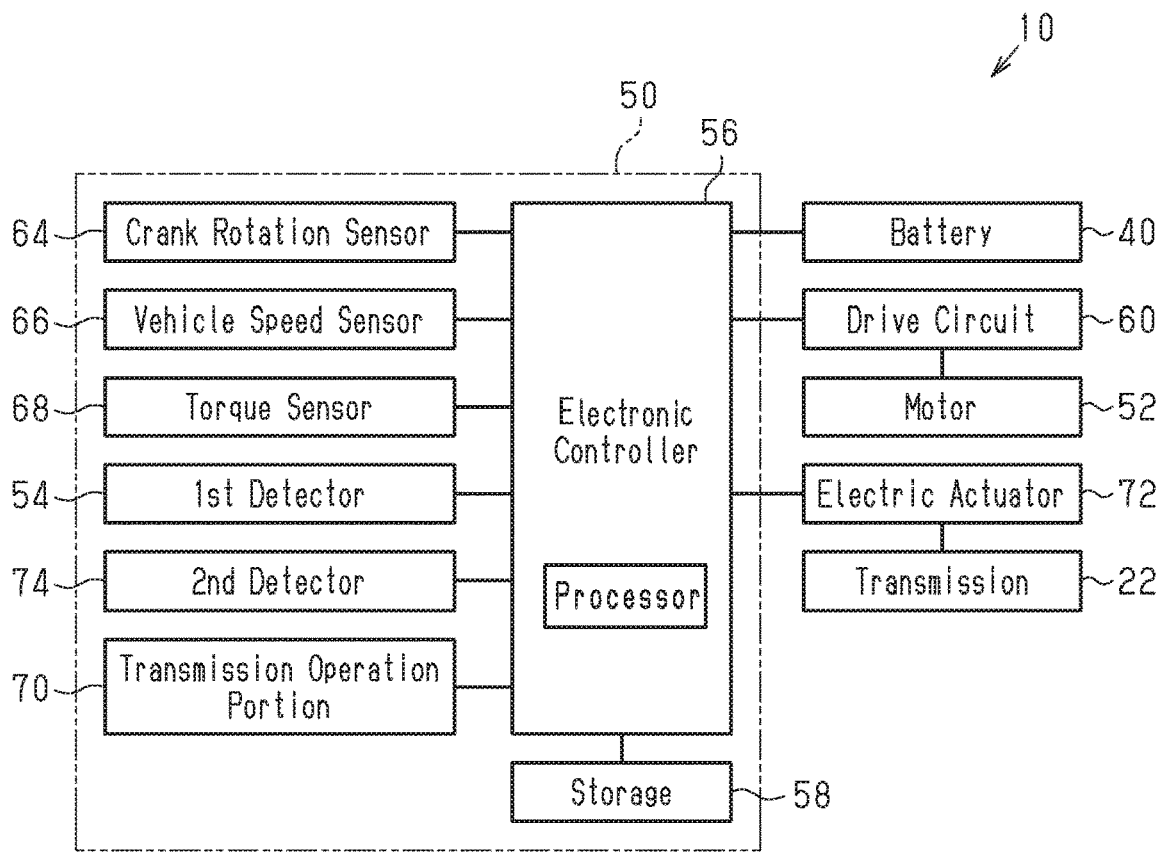
FIG. 3 is a block diagram showing an electrical configuration of the transmission control system for use with the human-powered vehicle in accordance with the first embodiment.

A transmission control system 50 in accordance with a second embodiment will now be described with reference to FIGS. 3 and 6. The transmission control system 50 in accordance with the second embodiment is similar to the transmission control system 50 in accordance with the first embodiment except in the process for controlling the motor 52 in a case in which a shift request is generated. Thus, same reference numerals are given to those components that are the same as the corresponding components of the first embodiment. Such components will not be described in detail.

The transmission control system 50 in accordance with the present embodiment is used in the human-powered vehicle 10 including the crank 12, the first rotation body 14, the drive wheel 16, the second rotation body 18, the transfer body 20, and the transmission 22. The transmission control system 50 includes the electric actuator 72 and the controller 56. The controller 56 does not actuate the transmission 22 upon generation of a shift request for the transmission 22 in a state in which the drive wheel 16 is rotated and the rotational angle CA of the crank 12 is maintained in a predetermined range WX.

Preferably, the transmission control system 50 in accordance with the present embodiment further includes the drive circuit 60, the third one-way clutch 62, the first detector 54, the storage 58, the crank rotation sensor 64, the vehicle speed sensor 66, the torque sensor 68, the transmission operation portion 70, and the second detector 74. The transmission control system 50 can further include the motor 52 but does not necessarily have to include the motor 52.

A process for controlling the transmission 22 in a case in which a shift request is generated will now be described with reference to FIG. 6. In a case where electric power is supplied to the controller 56, the controller 56 starts the process and proceeds to step S31 of the flowchart shown in FIG. 6.

In step S31, the controller 56 determines whether or not the drive wheel 16 is rotated and the rotational angle CA of the crank 12 is in a predetermined range WX. In a case in which the drive wheel 16 is rotated and the rotational angle CA of the crank 12 is not in the predetermined range WX, the controller 56 ends the process. In a case in which the drive wheel 16 is rotated and the rotational angle CA of the crank 12 is in the predetermined range WX, the controller 56 proceeds to step S32.

In step S32, the controller 56 determines whether or not a shift request has been generated. In a case in which the shift request has not been generated, the controller 56 ends the process. In a case in which the shift request has been generated, the controller 56 proceeds to step S33.

In step S33, the controller 56 ends the process without actuating the transmission 22. Specifically, the controller 56 does not actuate the transmission 22 in accordance with the shift request determined in step S32.

In a case in which the transmission 22 is not actuated in step S33, the controller 56 can suspend the process of actuating the transmission 22 in accordance with the shift request determined in step S32 until the drive wheel 16 is rotated or until the rotational angle CA of the crank 12 is outside the predetermined range WX. Further, the controller 56 can actuate the transmission 22 in a case in which the drive wheel 16 is rotated or in a case in which the rotational angle CA of the crank 12 is outside the predetermined range WX.

Third Embodiment

A transmission control system 50 in accordance with a third embodiment will now be described with reference to FIGS. 3 and 7. The transmission control system 50 in accordance with the third embodiment is similar to the transmission control system 50 in accordance with the second embodiment except in the process for controlling the motor 52 in a case in which a shift request is generated. Thus, same reference numerals are given to those components that are the same as the corresponding components of the second embodiment. Such components will not be described in detail.

In the present embodiment, the transmission control system 50 includes the electric actuator 72 and the controller 56. The transmission control system 50 includes a motor 52 for driving the transfer body 20. The controller 56 controls the motor 52 to drive the transfer body 20 in a case in which a shift request for the transmission 22 is generated and the transmission 22 is actuated in a state in which the drive wheel 16 is rotated and the rotational angle CA of the crank 12 is maintained in a predetermined range WX. The controller 56 actuates the motor 52 and the transmission 22 in a case in which a predetermined condition is satisfied upon generation of a shift request for the transmission 22 in a state in which the drive wheel 16 is rotated and the rotational angle CA of the crank 12 is maintained in a predetermined range WX.

In a case in which the transmission 22 includes a derailleur, the shift operation is not completed in a state the second rotation body 18 is not rotating. Since the transmission control system 50 includes the motor 52, the second rotation body 18 is rotated even in a case in which the crank 12 is not rotating. Therefore, even in a case in which the rotational angle CA of the crank 12 is maintained in the predetermined range WX and it is not rotating, the shift operation is completed by driving the motor 52.

Preferably, the transmission control system 50 in accordance with the present embodiment further includes the drive circuit 60, the third one-way clutch 62, the first detector 54, the storage 58, the crank rotation sensor 64, the vehicle speed sensor 66, the torque sensor 68, the transmission operation portion 70, and the second detector 74.

A process for controlling the motor 52 and the transmission 22 in a case in which a shift request is generated will now be described with reference to FIG. 7. In a case where electric power is supplied to the controller 56, the controller 56 starts the process and proceeds to step S41 of the flowchart shown in FIG. 7.

In step S41, the controller 56 determines whether or not the drive wheel 16 is rotated and the rotational angle CA of the crank 12 is in a predetermined range WX. In a case in which the drive wheel 16 is rotated and the rotational angle CA of the crank 12 is not in the predetermined range WX, the controller 56 ends the process. In a case in which the drive wheel 16 is rotated and the rotational angle CA of the crank 12 is in the predetermined range WX, the controller 56 proceeds to step S42.

In step S42, the controller 56 determines whether or not a shift request is generated. In a case in which a shift request is not generated, the controller 56 ends the process. In a case in which the shift request is generated, the controller 56 proceeds to step S43.

In step S43, the controller 56 determines whether or not to actuate the transmission 22. The controller 56 actuates the transmission 22 in a case in which a predetermined condition is satisfied. The predetermined condition is satisfied, for example, in a case in which shifting can be performed in accordance with the shift request. The controller 56 determines whether or not shifting can be performed in accordance with the shift request in a manner similar to step S27 of FIG. 5. The predetermined condition can be satisfied in a case in which shifting can be performed in accordance with the shift request and the second rotation body 18 is rotatable by driving the motor 52. The predetermined condition can be satisfied, for example, in a case in which shifting can be performed in accordance with the shift request and a voltage level of the battery 40 is greater than or equal to a predetermined voltage level. The predetermined voltage level corresponds to the voltage level allowing for driving of the motor 52. In a case in which the transmission 22 is actuated, the controller 56 proceeds to step S44.

In step S44, the controller 56 controls the motor 52 to the drive wheel 16 and does not drive the transfer body 20. Then, the controller 56 proceeds to step S45. In step S45, the controller 56 actuates the transmission 22 and ends the process. Specifically, the controller 56 actuates the transmission 22 in accordance with the shift request determined in step S42.

The controller 56 can stop driving the motor 52 in a case in which the shift operation of the transmission 22 is completed. The controller 56 can drive the electric actuator 72 and determine that a shift operation of the transmission 22 has been completed in a case in which a predetermined time elapses from a point of time at which the shift operation of the transmission 22 started. The controller 56 can determine the completion of the shift operation of the transmission 22 in accordance with the output of the shift sensor that detects the state of the transmission 22.

Fourth Embodiment

A transmission control system 50 in accordance with a fourth embodiment will now be described with reference to FIGS. 3 and 8. The transmission control system 50 in accordance with the fourth embodiment is similar to the transmission control system 50 in accordance with the first embodiment except in the process for controlling the motor 52 in a case in which a shift request is generated is different. Thus, same reference numerals are given to those components that are the same as the corresponding components of the first embodiment. Such components will not be described in detail.

Preferably, the controller 56 does not drive the motor 52 in a case in which a shift request for the transmission 22 is generated and the acceleration D is greater than or equal to the first value DX, the magnitude B of the vibration is greater than or equal to the second value BX, or the duration time T of the vibration is greater than or equal to the third value TX in a state in which the drive wheel 16 is rotated and the rotational angle CA of the crank 12 is maintained in the predetermined range WX.

In a state in which the drive wheel 16 is rotated and the rotational angle CA of crank 12 is maintained in a predetermined range WX, the controller 56 does not drive the motor 52 upon generation of a shift request for the transmission 22 in at least one of a case in which the steering angle S is greater than or equal to the first angle SX, a case in which the changing amount of the steering angle S is greater than or equal to the first changing amount X, a case in which the roll angle is greater than or equal to the second angle, a case in which the changing amount of the roll angle is greater than or equal to the second changing amount, a case in which the yaw angle is greater than or equal to the third angle, a case in which the changing amount of the yaw angle is greater than or equal to the third changing amount, a case in which the pitch angle is greater than or equal to the fourth angle, and a case in which the changing amount of the pitch angle is greater than or equal to the fourth changing amount.

The controller 56 does not actuate the transmission 22 in a case in which a shift request for the transmission 22 is generated and the motor 52 is not driven in a state in which the drive wheel 16 is rotated and the rotational angle CA of crank 12 is maintained in predetermined range WX.

A process for controlling the motor 52 and the transmission 22 in a case in which a shift request is generated will now be described with reference to FIG. 8. In a case where electric power is supplied to the controller 56, the controller 56 starts the process and proceeds to step S51 of the flowchart shown in FIG. 8.

In step S51, the controller 56 determines whether or not the drive wheel 16 is rotated and the rotational angle CA of the crank 12 is in a predetermined range WX. In a case in which the drive wheel 16 is rotated and the rotational angle CA of the crank 12 is not in the predetermined range WX, the controller 56 ends the process. In a case in which the drive wheel 16 is rotated and the rotational angle CA of the crank 12 is in the predetermined range WX, the controller 56 proceeds to step S52.

In step S52, the controller 56 determines whether or not a shift request is generated. In a case in which the shift request is not generated, the controller 56 ends the process. In a case in which the shift request is generated, the controller 56 proceeds to step S59.

In step S59, the controller 56 determines whether shifting can be performed in accordance with the shift request. The process in step S59 is the same as the process in step S27. If the controller 56 determines that shifting can be performed, then the controller 56 proceeds to step S53. If the controller 56 determines that shifting cannot be performed, then the controller 56 ends the process.

In step S53, the controller 56 determines whether or not the third condition is satisfied. The third condition is satisfied in a case in which the acceleration D is greater than or equal to the first value DX, the magnitude B of the vibration is greater than or equal to the second value BX, or the duration time T of the vibration is greater than or equal to the third value TX. In a case in which the third condition is satisfied, the controller 56 proceeds to step S54.

In step S54, the controller 56 does not drive the motor 52 and proceeds to step S55. In step S55, the controller 56 ends the process without actuating the transmission 22.

In a case in which the third condition is not satisfied in step S53, the controller 56 proceeds to step S56. In step S56, the controller 56 determines whether or not the fourth condition is satisfied. The fourth condition is satisfied in at least one of a case in which the steering angle S is greater than or equal to the first angle SX, a case in which the changing amount of the steering angle S is greater than or equal to the first changing amount X, a case in which the roll angle is greater than or equal to the second angle, a case in which the changing amount of the roll angle is greater than or equal to the second changing amount, a case in which the yaw angle Is greater than or equal to the third angle, a case in which the changing amount of the yaw angle is greater than or equal to the third changing amount, the pitch angle is greater than or equal to the fourth angle, and a case in which the changing amount of the pitch angle is greater than or equal to the fourth changing amount. In a case in which the fourth condition is satisfied, the controller 56 proceeds to step S54.

In a case in which the fourth condition is not satisfied in step S56, the controller 56 proceeds to step S57. In step S57, the controller 56 controls the motor 52 so that the drive wheel 16 is driven and the transfer body 20 is not driven. Then, the controller 56 proceeds to step S58. In step S58, the controller 56 actuates the transmission 22 and then ends the process. Specifically, the controller 56 actuates the transmission 22 in accordance with the shift request determined in step S52.

The controller 56 can stop driving the motor 52 in a case in which the shift operation of the transmission 22 has been completed. The controller 56 can drive the electric actuator 72, and determine that the shift operation of the transmission 22 has been completed in a case in which a predetermined time has elapsed from the point of time at which the shift operation of the transmission 22 started. The controller 56 can determine the completion of the shift operation of the transmission 22 in accordance with the output of the shift sensor that detects the state of the transmission 22.

Modifications

The description related with the above embodiments exemplifies, without any intention to limit, an applicable form of a transmission control system for use with a human-powered vehicle in accordance with the present disclosure. In addition to the embodiments described above, the transmission control system for use with the human-powered vehicle in accordance with the present disclosure is applicable to, for example, modifications of the above embodiments that are described below and combinations of at least two of the modifications that do not contradict each other. In the modifications described hereinafter, same reference numerals are given to those components that are the same as the corresponding components of the above embodiments. Such components will not be described in detail.

Figure 5:
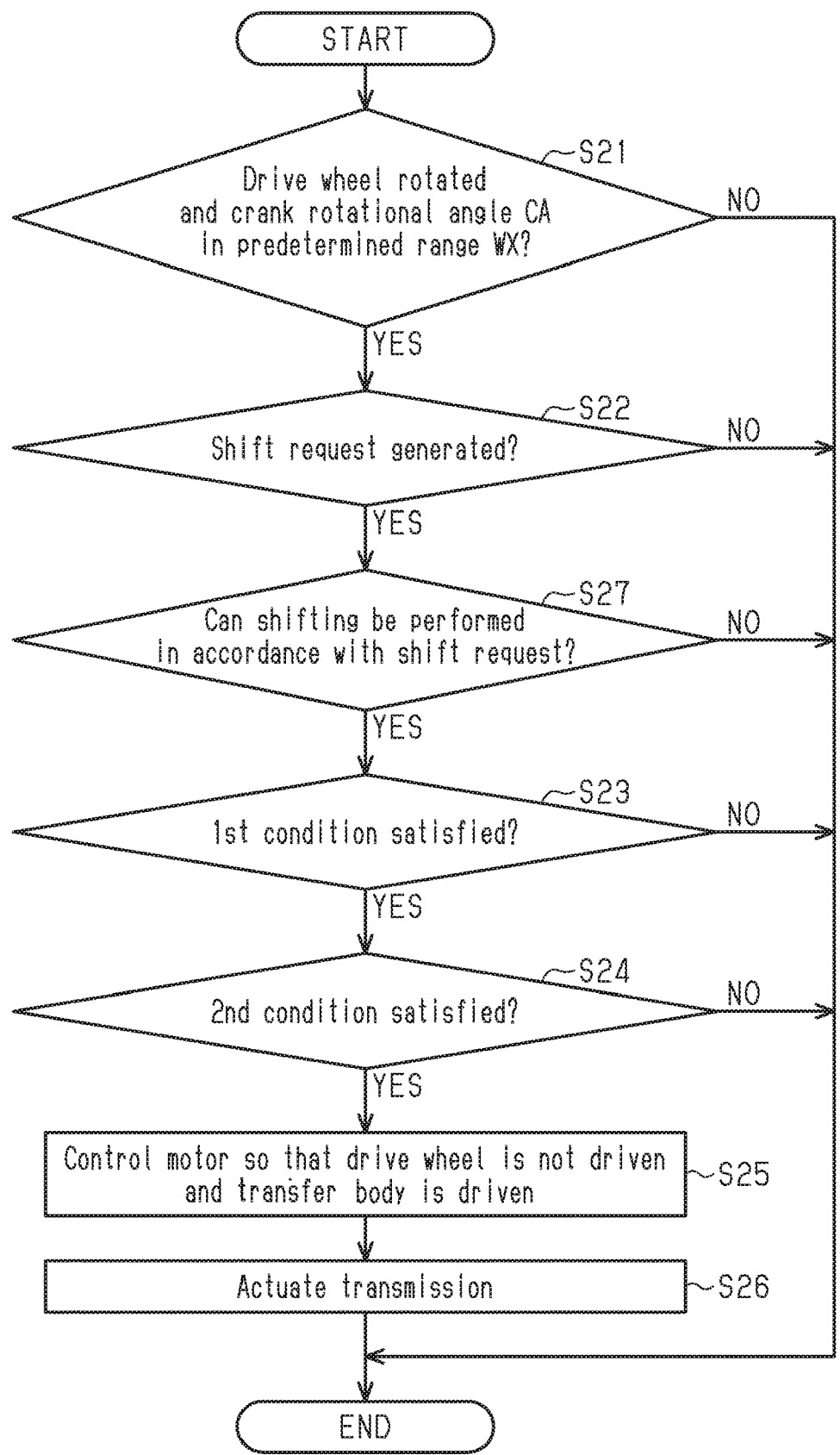
FIG. 5 is a flowchart of a process for controlling the motor and the transmission executed by the electronic controller of FIG. 3.
Figure 9:
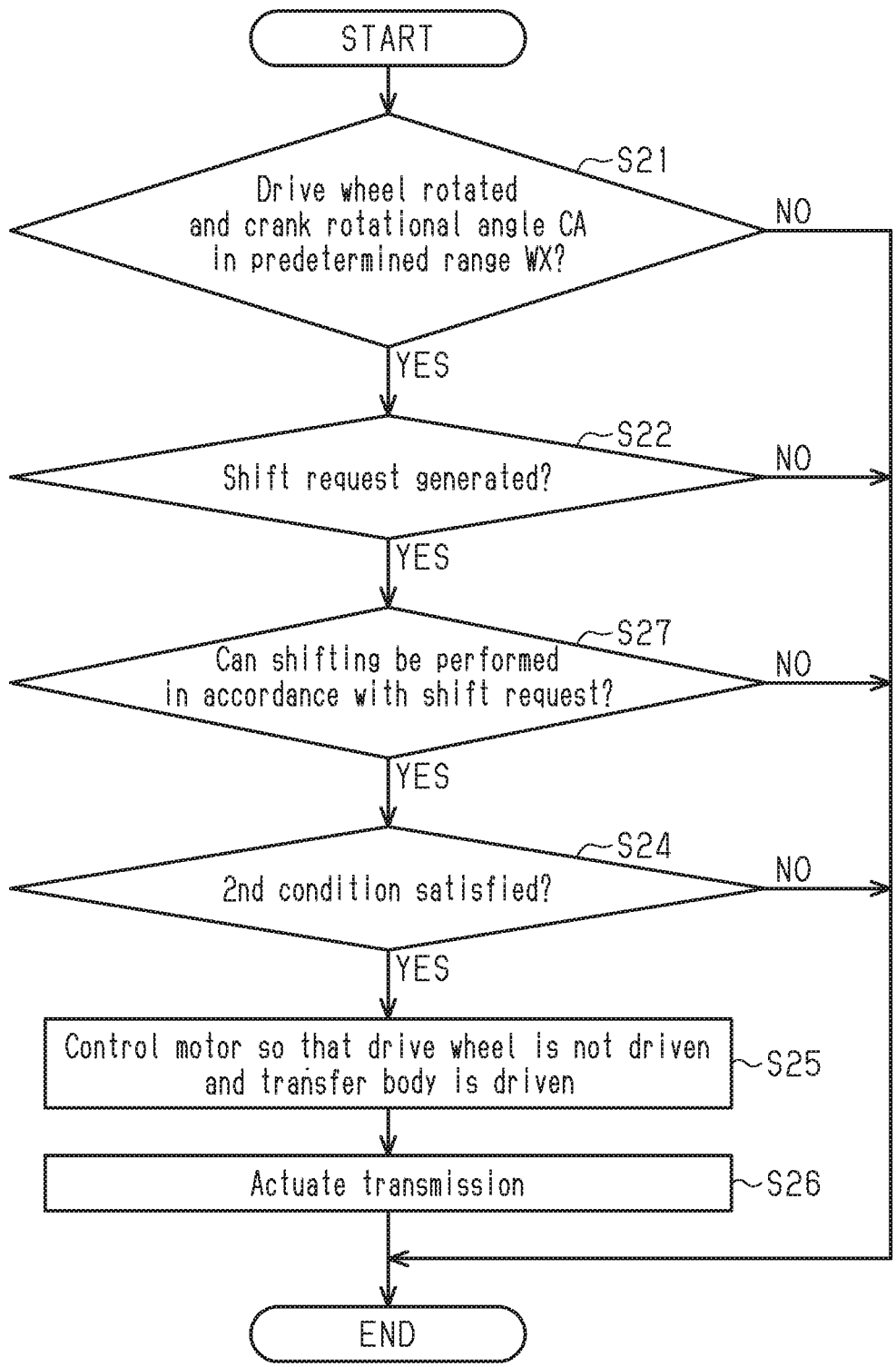
FIG. 9 is a flowchart of a process for controlling a motor and a transmission executed by an electronic controller in accordance with a modification.

The process of step S23 of the first embodiment can be omitted from FIG. 5 in accordance with one modification. In this case, as shown in FIG. 9, in a case in which determination is YES in step S27, the process proceeds to step S24. In a case in which step S23 is omitted, the first detector 54 is omitted.

The process of step S24 of the first embodiment can be omitted from FIG. 5 in accordance with one modification. In this case, in a case in which determination is YES in step S23, the process proceeds to step S25. In a case in which step S24 is omitted, the second detector 74 is omitted.

In FIG. 5 of the first embodiment, the order of the processes of step S24 and step S23 can be reversed. In the first embodiment and the modification, the order of the process of step S27 can be changed in accordance with one modification. For example, the process of step S27 can be performed between step S23 and step S24 or between step S24 and step S25.

Figure 8:
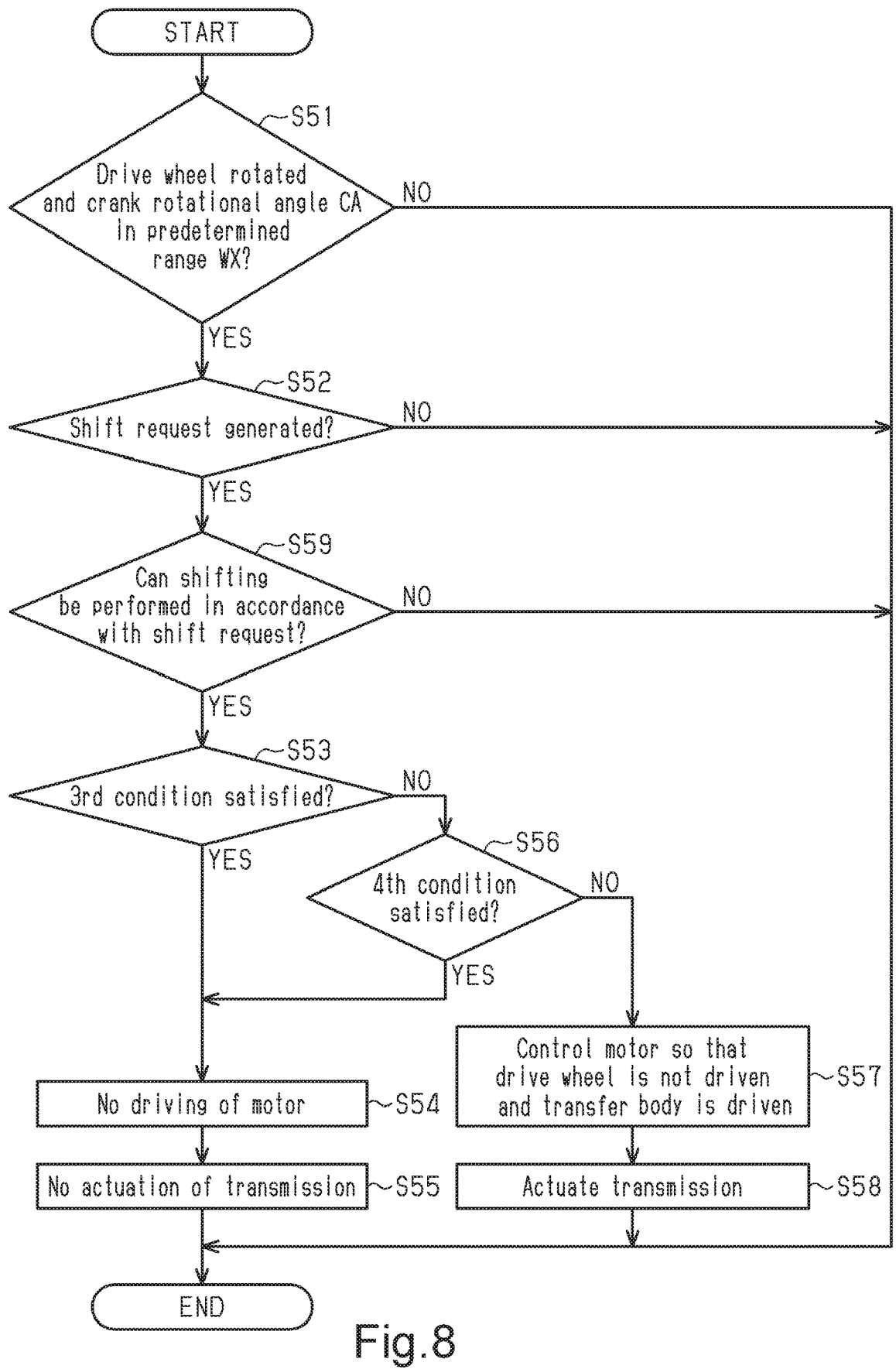
FIG. 8 is a flowchart of a process for controlling a motor and a transmission executed by an electronic controller in accordance with a fourth embodiment.

The processes of steps S54 and S55 of the fourth embodiment can be omitted from FIG. 8 in accordance with one modification. In this case, the process is ended in a case in which the determination of step S53 is YES and in a case in which the determination of step S56 is YES.

In FIG. 8 of the fourth embodiment, the order of the processes of step S54 and step S55 can be reversed in accordance with one modification. In the eighth embodiment and the modification, the order of the process of step S59 can be changed. For example, the process of step S59 can be performed between step S53 and step S54 or between step S56 and step S57.

In each embodiment and each modification, the transmission operation portion 70 can be a mechanical operated device that actuates the transmission 22 with a cable. In this case, the electric actuator 72 can be omitted. A shift request is input to the controller 56 by providing a sensor for detecting the operation of the operated device on one of the operated device and the cable and connecting the sensor to the controller 56 through wireless or wired connection. A shift request can be input to the controller 56 by a shift sensor provided in the transmission 22. In a case in which the transmission 22 is actuated using a mechanical operated device, the processes of step S26 of FIG. 5, step S33 of FIG. 6, step S45 of FIG. 7, step S58 of FIG. 8, and step S26 of FIG. 9 are omitted.

In each embodiment and each modification, the motor 52 can be configured so as not to assist propulsion of the human-powered vehicle 10. For example, the motor 52 can be provided on the frame 24 to drive the transfer body 20 with a pulley.

Figure 6:
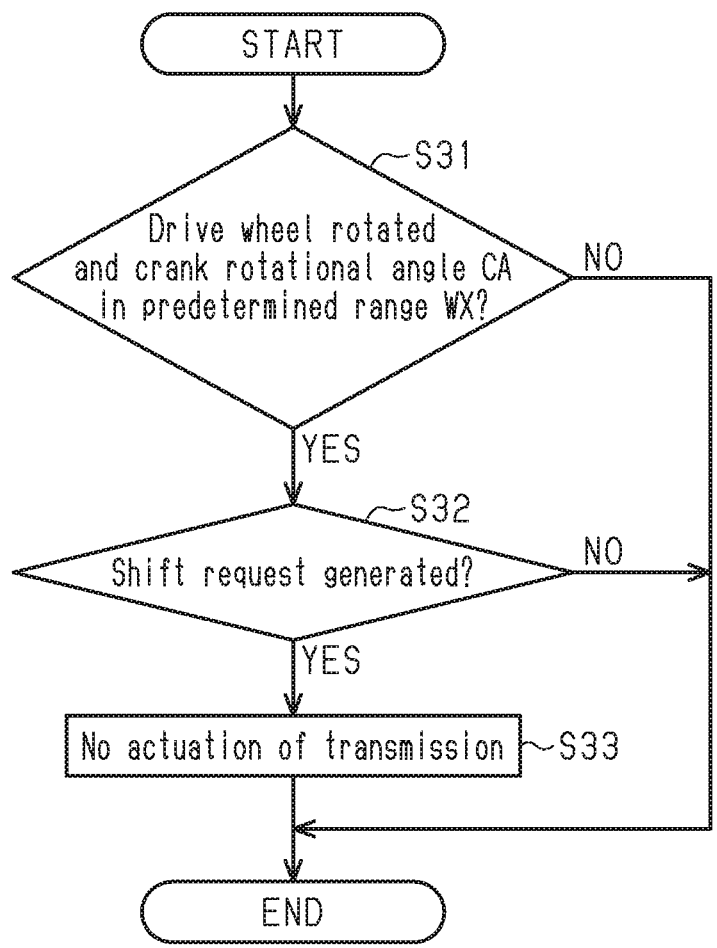
FIG. 6 is a flowchart of a process for controlling a transmission executed by an electronic controller in accordance with a second embodiment.
Figure 7:
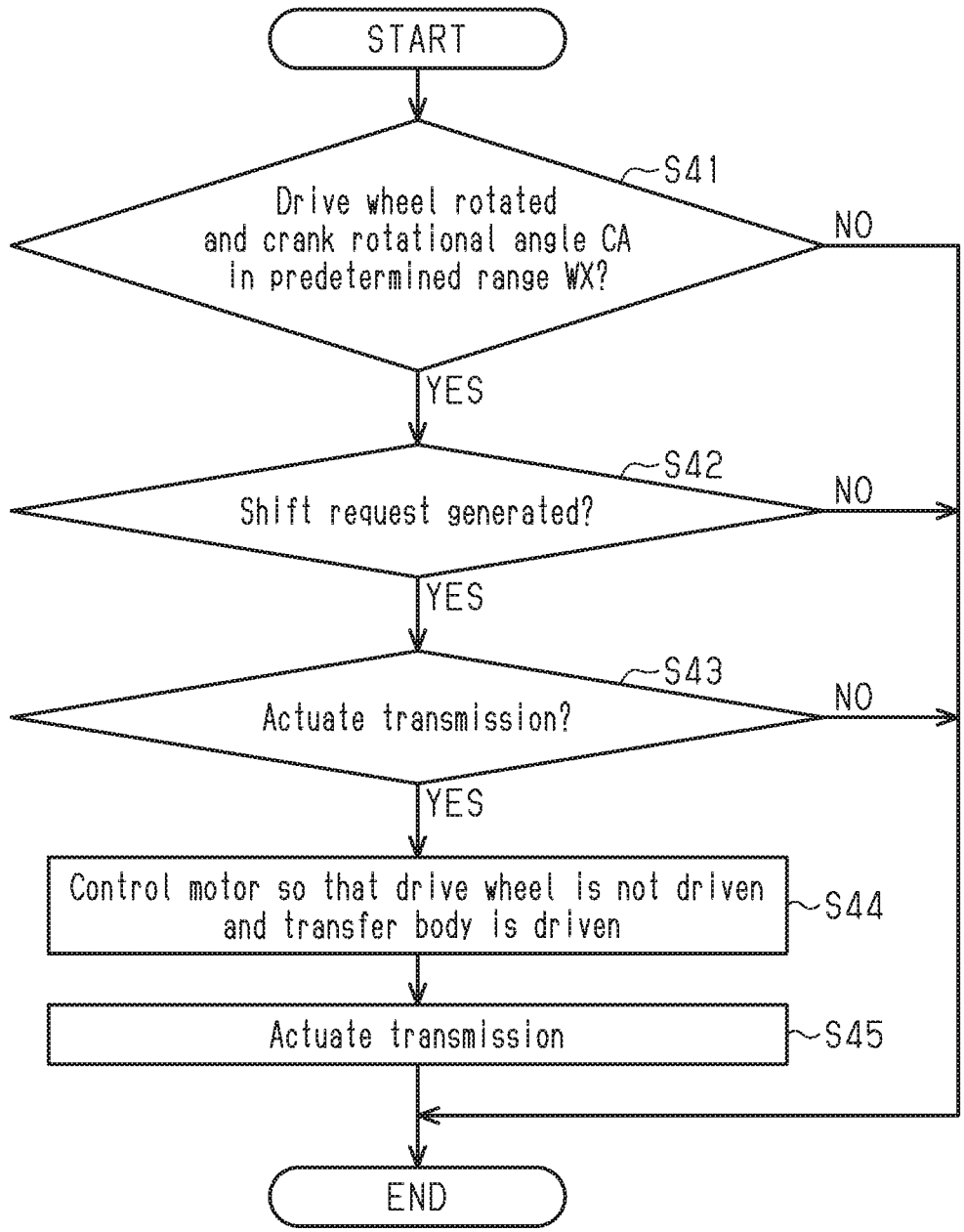
FIG. 7 is a flowchart of a process for controlling a motor and a transmission executed by an electronic controller in accordance with a third embodiment.

The controller 56 can give a determination of YES in steps S21, S31, S41, and S51 in a case in which the balance between the first load G1 and the second load G2 applied to the crank 12 is a predetermined balance instead of or in addition to step S21 of FIG. 5, step S31 of FIG. 6, step S41 of FIG. 7, step S51 of FIG. 8 and step S21 of FIG. 9. The first load G1 and the second load G2 are loads applied to the left and right crank arms 28 or loads applied to the left and right pedals 30. Preferably, in this case, the transmission control system 50 further includes a detector that detects the first load G1 and the second load G2. In a case in which the detector detects the load of each of the left and right crank arms 28, the detector includes, for example, a strain sensor, a magnetostrictive sensor, or the like. The strain sensor includes a strain gauge. Preferably, the detector detects strain in a direction orthogonal to the extending direction of each crank arm 28 and the extending direction of the rotation axis center of the crankshaft 26. Preferably, one of the first load G1 and the second load G2 is detected from a force applied in one of the rotational directions of a corresponding one of the crank arms 28 as a positive value, and the other of the first load G1 and the second load G2 is detected from a force applied in the other of the rotational direction of a corresponding one of the crank arm 28 as a positive value. In a case in which the detector detects the load of each of the left and right pedals 30, the detector includes, for example, a load sensor, a pressure sensor, or the like. The detector is provided on at least one of the surfaces of a corresponding one of the pedals 30 and the connecting portion between a corresponding one of the pedal 30s and the crank arms 28. For each of the pedals 30, the connecting portion includes a pedal shaft that rotatably supports a corresponding one of the pedals 30 with respect to a corresponding one of the crank arms 28. Preferably, the detector detects a load or pressure load applied to each pedal 30 toward a lower side in the vertical direction. Preferably, the first load G1 and the second load G2 are detected from forces applied to the pedals 30 toward the lower side in the vertical direction as positive values. The controller 56 can use the absolute value of the load detected by the detector as the first load G1 and the second load G2.

In one example, the controller 56 gives a determination of YES in steps S21, S31, S41, and S51 in a case in which a state in which the first ratio of the first load G1 to the second load G2 is included in the first range or in a case in which the absolute value of the difference between the first load G1 and the second load G2 is less than a predetermined value. Preferably, the first range XR includes a range of at least part of greater than or equal to 7/13 and less than or equal to 13/7. Preferably, the first range XR includes one.

In another example, the controller 56 gives a determination of YES in steps S21, S31, S41, and S51 in a case in which one of the first load G1 and the second load G2 applied in a predetermined rotational direction is increased and then the other one of the first load G1 and the second load G2 applied in the rotational direction opposite to the predetermined rotational direction is increased in a state in which one of the left and right crank arms 28 is located in one of a second range and a third range that is in one half of a range around the crankshaft 26 and the other one of the left and right crank arms 28 is located in the other half of the second range and the third range.

The controller 56 can be configured to give a determination of YES in steps S21, S31, S41, and S51 in a case in which one of the first load G1 and the second load G2 applied in the rotational direction opposite to the predetermined rotational direction of the crankshaft 26 is greater than or equal to a predetermined value GX instead of or in addition to step S21 of FIG. 5, step S31 of FIG. 6, step S41 of FIG. 7, step S51 of FIG. 8 and step S21 of FIG. 9. Preferably, for example, the predetermined value GX is greater than or equal to 80 newtons. More preferably, for example, the predetermined value GX is less than or equal to 150 newtons.

The transmission 22, the first rotation body 14 and the second rotation body 18 can be provided in a housing that rotatably supports the crankshaft 26 to form a transmission mechanism as disclosed in, for example, U.S. Pat. No. 9,789,928.

What is claimed is:

1. A transmission control system for use with a human-powered vehicle including a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio, the transmission control system comprising:
a motor configured to drive the transfer body;
a first detector configured to detect at least one of acceleration and vibration of the human-powered vehicle; and
an electronic controller configured to control the motor in accordance with a detection result of the first detector upon generation of a shift request for the transmission in a state in which the drive wheel is rotated and a rotational angle of the crank is maintained in a predetermined range.

2. The transmission control system according to claim 1, wherein
the electronic controller is configured to not drive the motor while the transmission is in a state in which the drive wheel is rotated and the rotational angle of the crank is maintained in the predetermined range, and upon generation of a shift request for the transmission in any one of a case in which the acceleration is greater than or equal to a first value, a case in which a magnitude of the vibration is greater than or equal to a second value, and a case in which a duration time of the vibration is greater than or equal to a third value.

3. The transmission control system according to claim 1, wherein
the electronic controller is configured to control the motor so that the motor does not drive the drive wheel but drives the transfer body while the transmission is in a state in which the drive wheel is rotated and the rotational angle of the crank is maintained in the predetermined range, and upon generation of a shift request for the transmission in any one of a case in which the acceleration is less than a first value, a case in which a magnitude of the vibration is less than a second value, and a case in which a duration time of the vibration is less than a third value.

4. The transmission control system according to claim 1, further comprising:
a second detector that detects at least one of first information related to a state of a steering unit of the human-powered vehicle and second information related to a posture of the human-powered vehicle, the electronic controller being configured to control the motor in accordance with a detection result of the second detector upon generation of a shift request for the transmission in a state in which the drive wheel is rotated and the rotational angle of the crank is maintained in the predetermined range.

5. A transmission control system for use with a human-powered vehicle including a steering unit, a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio, the transmission control system comprising:
- a motor configured to drive the transfer body;
- a second detector configured to detect at least one of first information related to a state of the steering unit and second information related to a posture of the human-powered vehicle; and
- an electronic controller configured to control the motor in accordance with a detection result of the second detector upon generation of a shift request for the transmission in a state in which the drive wheel is rotated and a rotational angle of the crank is maintained in a predetermined range.

6. The transmission control system according to claim 4, wherein
the second information includes at least one of a roll angle of the human-powered vehicle, a yaw angle of the human-powered vehicle, and a pitch angle of the human-powered vehicle.

7. The transmission control system according to claim 4, wherein
the first information includes a steering angle that includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle.

8. The transmission control system according to claim 6, wherein
the first information includes a steering angle that includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle; and
the electronic controller is configured to not drive the motor while the transmission is in a state in which the drive wheel is rotated and the rotational angle of the crank is maintained in the predetermined range, and upon generation of a shift request in at least one of a case in which the steering angle is greater than or equal to a first angle, a case in which a changing amount of the steering angle is greater than or equal to a first changing amount, a case in which the roll angle is greater than or equal to a second angle, a case in which a changing amount of the roll angle is greater than or equal to a second changing amount, a case in which the yaw angle is greater than or equal to a third angle, a case in which a changing amount of the yaw angle is greater than or equal to a third changing amount, a case in which a pitch angle is greater than or equal to a fourth angle, and a case in which a changing amount of the pitch angle is greater than or equal to a fourth changing amount.

9. The transmission control system according to claim 6, wherein
the first information includes a steering angle that includes at least one of an angle of a handlebar of the human-powered vehicle relative to a frame of the human-powered vehicle, an angle of a steering wheel of the human-powered vehicle relative to the frame of the human-powered vehicle, and an angle of a front fork of the human-powered vehicle relative to the frame of the human-powered vehicle;
the electronic controller is configured to drive the motor while the transmission is in a state in which the drive wheel is rotated and the rotational angle of the crank is maintained in the predetermined range, and upon generation of a shift request for the transmission in at least one of a case in which the steering angle is less than a first angle, a case in which a changing amount of the steering angle is less than a first changing amount, a case in which the roll angle is less than a second angle, a case in which a changing amount of the roll angle is less than a second changing amount, a case in which the yaw angle is less than a third angle, a case in which a changing amount of the yaw angle is less than a third changing amount, a case in which a pitch angle is less than a fourth angle, and a case in which a changing amount of the pitch angle is less than a fourth changing amount.

10. The transmission control system according to claim 1, further comprising:
an electric actuator configured to actuate the transmission,
the electronic controller being further configured to control the electric actuator, and
the electronic controller being further configured to not actuate the transmission while the transmission is in a state in which the drive wheel is rotated and the rotational angle of the crank is maintained in the predetermined range, and upon generation of a shift request for the transmission in a case in which the electronic controller does not drive the motor.

11. A transmission control system for use with a human-powered vehicle including a crank, a first rotation body that is rotatable independently from the crank, a drive wheel, a second rotation body that is rotatable independently from the drive wheel, a transfer body that transfers rotation force between the first rotation body and the second rotation body, and a transmission that controls the transfer body and shifts a transmission ratio, the transmission control system comprising:
an electric actuator that actuates the transmission; and
an electronic controller configured not to actuate the transmission upon generation of a shift request for the transmission while the transmission is in a state in which the drive wheel is rotated and a rotational angle of the crank is maintained in a predetermined range.

12. The transmission control system according to claim 11, further comprising:
a motor configured to drive the transfer body,
the electronic controller being configured to control the motor to drive the transfer body while the transmission is in a state in which the drive wheel is rotated and the rotational angle of the crank is maintained in the predetermined range, and upon generation of a shift request for the transmission in a case in which the electronic controller actuates the transmission.

13. The transmission control system according to claim 1, wherein
the motor is connected to a transmission path of human driving force input to the human-powered vehicle at an upstream side of the transfer body.

14. The transmission control system according to claim 1, wherein
the motor is configured to assist in propulsion of the human-powered vehicle.

15. The transmission control system according to claim 14, wherein
the electronic controller is configured to control the motor in accordance with human driving force input to the human-powered vehicle in a case in which the crank is rotating in a predetermined direction.

16. The transmission control system according to claim 1, wherein
the predetermined range includes an angle separated by 90 degrees from an angle at which a crank arm of the crank is located at a top or bottom dead center.

17. The transmission control system according to claim 1, wherein
the predetermined range is less than or equal to 30 degrees.

18. The transmission control system according to claim 1, further comprising a transmission operation portion that outputs the shift request.

19. The transmission control system according to claim 1, wherein
the electronic controller is configured to generate the shift request in accordance with at least one of a riding state of the human-powered vehicle and a riding environment of the human-powered vehicle.

20. The transmission control system according to claim 1, wherein
the first rotation body and the second rotation body each include a sprocket,
the transfer body includes a chain, and
the transmission includes a derailleur.

* * * * *